US007412626B2

(12) United States Patent
Wood et al.

(10) Patent No.: US 7,412,626 B2
(45) Date of Patent: Aug. 12, 2008

(54) METHOD AND SYSTEM FOR INTELLIGENT AND ADAPTIVE EXCEPTION HANDLING

(75) Inventors: Eric Wood, Menlo Park, CA (US); Boris Tsyganskiy, Los Gatos, CA (US)

(73) Assignee: SAP AG, Walldorf (DE)

( * ) Notice: Subject to any disclaimer, the term of this patent is extended or adjusted under 35 U.S.C. 154(b) by 700 days.

(21) Appl. No.: 10/851,025

(22) Filed: May 21, 2004

(65) Prior Publication Data

US 2005/0262472 A1    Nov. 24, 2005

(51) Int. Cl.
*G06F 11/00* (2006.01)
(52) U.S. Cl. ............................................ 714/38; 714/4
(58) Field of Classification Search ........................ None
See application file for complete search history.

(56) References Cited

U.S. PATENT DOCUMENTS 6,553,507 B1 * 4/2003 Cohen ........................... 714/4
6,629,267 B1 * 9/2003 Glerum et al. ................ 714/38
6,745,350 B1 * 6/2004 Cline et al. .................... 714/49
6,757,837 B1 * 6/2004 Platt et al. ...................... 714/4
2004/0128585 A1 * 7/2004 Hind et al. .................... 714/38

* cited by examiner

*Primary Examiner*—Michael C Maskulinski
(74) *Attorney, Agent, or Firm*—Blakely, Sokoloff, Taylor & Zafman (57) ABSTRACT

A method and system for handling errors and exceptions in an ERP environment are disclosed. According to one aspect of the present invention, a condition or event causes a script-engine associated with a particular ERP server to generate an error message. The error message is communicated to a centralized controller-node. The centralized controller-node analyzes the message and determines the best course of action for handling an error or exception related to the error message. Based on the controller node's analysis, the controller node communicates a response message, thereby enabling the process that caused the error to continue without terminating abnormally.

19 Claims, 6 Drawing Sheets

METHOD AND SYSTEM FOR INTELLIGENT AND ADAPTIVE EXCEPTION HANDLING

FIELD OF THE INVENTION

The present invention relates generally to enterprise resource planning servers, and more particularly to a method and system for adaptively handling errors and exceptions in an enterprise resource planning environment.

BACKGROUND OF THE INVENTION

Software applications in the field of enterprise resource planning ("ERP") attempt to integrate all facets of a business including planning, manufacturing, sales, and marketing. As the ERP methodology has become more popular, software applications have emerged to help business managers implement ERP in business activities such as inventory control, order tracking, customer service, finance and human resources. However, the increase in the popularity of ERP systems has also led to an increase in their general level of complexity. One of the natural consequences of this increased complexity is the introduction of unforeseen incompatibilities and errors due to integration problems amongst the different software modules and components.

In a traditional ERP environment, with the exception of reporting the error to a user or an administrator, a server that encounters an error has no way of handling, or otherwise acting upon, the error. Traditionally, the only corrective action possible is for an administrator to correct the error by, for example, changing the code of the application or transaction script that caused the error. However, correcting one application provides only a limited solution to a potentially larger problem. For example, if other related applications create the same or a similar error when executed, an administrator must correct each individual application in order to solve the problem.

Furthermore, in a traditional ERP environment, there is limited opportunity for the administrator, who fixes the problem, to share his knowledge of the problem with other administrators in the organization. For example, if an organization has several departments each with its own administrator, an administrator that corrects an error in an application in one department will, more than likely, not identify the problem and provide a solution to the administrators in the other departments. Consequently, if an administrator in another department encounters the same or a similar problem, that administrator will have to come up with a solution, which may or may not be the same solution used by the first administrator.

SUMMARY OF THE INVENTION

A method and system for handling an exception in an ERP environment are provided. In accordance with a method for handling an exception, an ERP server generates an error message and communicates the message over a network to a centralized controller-node. The centralized controller-node receives the error message and analyzes the message to determine the best course of action for handling an exception associated with the message. The controller-node determines the potential solutions and then selects the best solution for handling the specific exception. Then, the controller-node communicates a response message to the server that originally reported the error message. Other features of the present invention will be apparent from the accompanying drawings and from the detailed description that follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

A method and system for handling exceptions, including errors, when executing scripts are described. In the following description, for purposes of explanation, numerous specific details are set forth in order to provide a thorough understanding of the present invention. It will be evident, however, to one skilled in the art that the present invention may be practiced without these specific details.

Consistent with one embodiment of the present invention, a network-connected controller-node receives an error message over a network from one of several network-connected servers. The controller-node analyzes the error message to determine a solution, or best course of action to take, based on the error message. Once a course of action has been selected, the controller-node performs the action, which may include communicating a script command or data to the server that originally reported the error.

The present invention is advantageous over prior exception and error handling systems and routines for several reasons. First, the controller-node of the present invention is centralized thereby reducing the complexity and difficulties associated with managing several repositories for exception handling routines. In addition, storing exception handling routines at a centralized controller-node, as opposed to coding each application or transaction script with one or more routines to handle errors as they are encountered, minimizes the overall size and complexity of the individual applications or scripts while maximizing the opportunity to reuse code modules, such as scripts and script commands. Finally, because the centralized controller-node has intelligence and self-learning capabilities and is adaptive to the state of its environment, applications and scripts do not have to be modified each time a condition, or a state of the network environment, changes. Other advantages of the present invention will become apparent from the following description of the invention.

Figure 1:
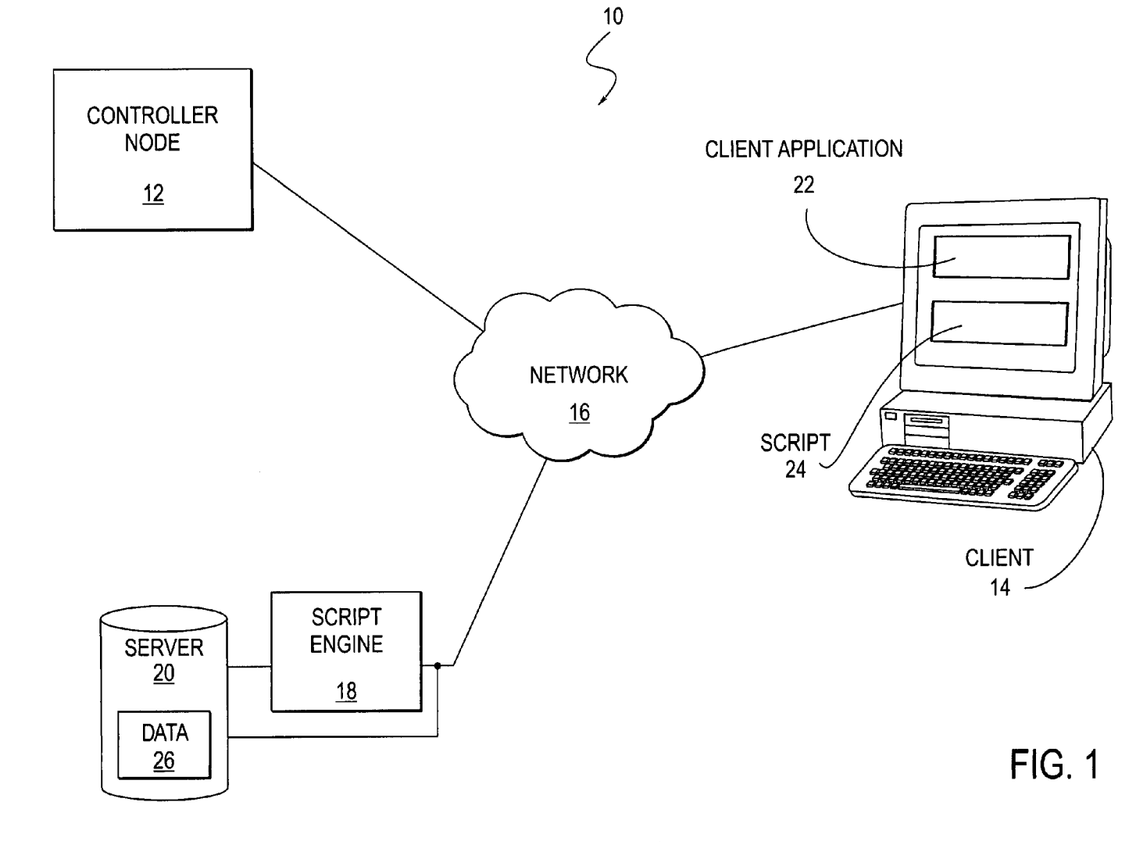
FIG. 1 illustrates an example of a simple multi-node, client-server network environment with a centralized, adaptive controller-node for handling exceptions.

FIG. 1 illustrates an example of a simple multi-node, client-server network environment 10 with a centralized and adaptive controller-node 12 for handling exceptions. The multi-node network environment 10 illustrated in FIG. 1 includes a client 14 connected via a network 16 to a script-engine 18 and server 20, as well as a centralized and adaptive controller-node 12 consistent with one embodiment of the invention. The network 16 connecting each node can be any type of network including a local area network (LAN) or a wide area network (WAN), as well as a wired or wireless network. For purposes of the invention, a node includes any computer or processing device having a unique network address, including but not limited to servers, clients, and script engines.

Consistent with the present invention, a user interacts with a client application 22, executing on the client 14, to execute automated scripts 24 associated with the script-engine 18. The automated scripts 24 execute on the script-engine 18, which communicates server-specific commands to the server 20 to manipulate data 26. The scripts 24 allow a user to automatically perform a series of operations on the server 26 by executing a single script command. For one embodiment of the invention, if during the execution of a script, a particular server-specific command results in an error, the script-engine 18 will communicate an error message to the controller-node 12. In turn, the centralized controller-node 12 will determine the best course of action for handling the error associated with the error message.

Alternatively, the user may bypass the script-engine and execute one or more applications directly on the server 26. If the server 26 encounters an error while executing the application, the server 26 may communicate an error message to the controller-node 12. In response, the controller-node 12 will determine the best course of action for handling the error associated with the error message reported by the server 26.

In FIG. 1, the client 14 is illustrated as a desktop personal computer. However, it will be appreciated that the client 14 can be any computing device, including a laptop computer, notebook computer, personal digital assistant (PDA), or handheld wireless phone. The client application 22 that executes on the client 14 might be a thick client, having significant functionality and intelligence built-in, or alternatively, a thin client, such as an extensible mark-up language (XML) application, or a simple web browser.

In FIG. 1, the script engine 18 is shown as a separate component or module from the server 20. However, it will be appreciated that the script engine 18 could be a system level service or other process executing on the server 20. Alternatively, the script engine 18 could be a software module that executes on a separate computer and communicates with the server 20 via a network connection. Regardless of the implementation, the script engine 18 is closely associated with the server 20. The client application 22 on the client 14 presents the user with a graphical user interface by which the user interacts with the server 20 and the script-engine 18 in particular. Alternatively, the user interface might be a simple command line interface. In either case, a user typically initiates a user session by entering user credentials at the client 14 and logging in to the server 20.

After initiating a user session, a user may initiate a script-engine session. A script-engine session may be initiated by selecting an icon or menu item in a graphical user interface at the client 14. Alternatively, a script-engine session might be initiated by entering a command at a command line interface. During a script-engine session, a user can execute a script or script command to perform a series of operations on the server 20. A script comprises a series of script commands and associated data for performing a particular task on the server 20.

For one embodiment of the invention, the script engine 18 receives scripts or script commands in a generic format, referred to as script-interchange format, and interprets or translates the commands to be server-specific before communicating the commands to the server 20. The server 20 receives the server-specific commands and attempts to execute them. However, in some instances, for one reason or another, the server 20 may not be able to properly execute a command. Furthermore, in some instances, the error encountered may be catastrophic in the sense that the process that causes the error may not be able to recover from the error and continue executing. For example, a catastrophic error results in a process abnormally terminating.

For one embodiment of the invention, when the server 20 cannot execute a command, the server 20 will generate a server-specific error message and report it to the script engine 18. The script engine 18 analyzes the error message and reports a script error message, including the server-specific error, to the controller-node 12. For example, the script engine may format the script message error in the form of a query before communicating it to the controller-node 12. Alternatively, the script engine 18 may pass the server-specific error along directly to the controller-node 12. In an alternative embodiment, the server 20 may bypass the script engine 18 altogether and directly communicate the server-specific error to the centralized controller-node 12.

One simple scenario involving an error that the controller-node 12 might handle involves a situation where a script, executing on a script engine 18, erroneously indicates the location of some particular data. It will be appreciated that the following scenario is presented as just one of countless examples for which an error may be reported to the controller-node 12 for handling. Referring to FIG. 1, using the client application 22 a user may execute a script to generate and display a list of all salaried employees associated with a particular department in a large organization. Unbeknownst to the user, the script may indicate that the particular data the user would like to retrieve is located in a database residing on server A (not shown), when in fact, the data 26 resides on the server illustrated in FIG. 2 with reference number 20. Accordingly, when the user executes the script, the client application 22 communicates a series of script commands and associated data to the script engine 18, which interprets the commands and communicates them to the server 20. When the server 20 receives the particular command that erroneously indicates that the requested data is located on server A, the server 20 communicates a request for the data to server A. In response, server A communicates a message to the server 20, indicating that the data is not located on server A. Because the server 20 is unable to successfully execute the command, the server 20 generates a server error indicating that the requested data is not located where specified by the script. Consequently, the server 20 communicates the server error message to the script engine 20, which in turn communicates the server error message to the controller-node 12 for handling. As will be described in further detail below, the controller-node 12 receives the error message and analyzes it to determine its cause and to find a potential solution. For one embodiment of the invention, the controller-node 12 processes the otherwise catastrophic error, allowing the process or script that caused the error to continue, as opposed to exiting ungracefully, or terminating abnormally.

Figure 2:
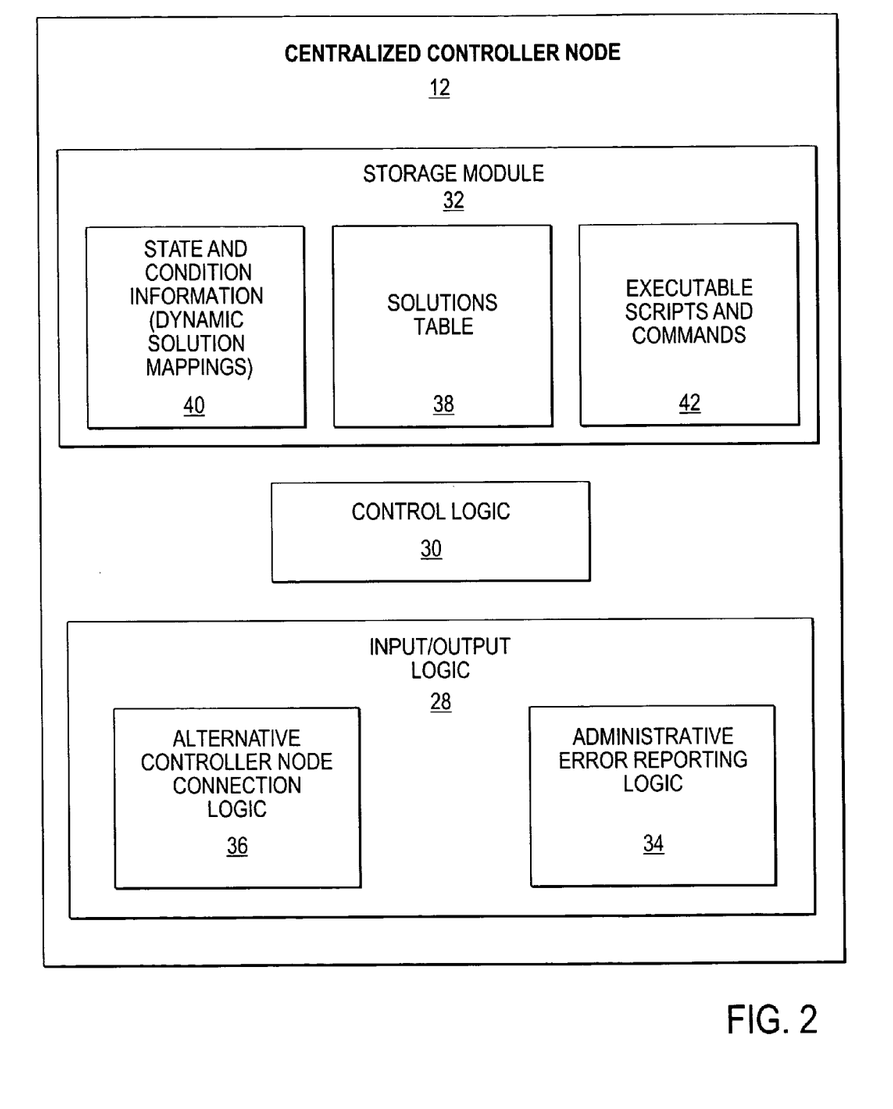
FIG. 2 illustrates an example of a centralized, adaptive controller-node consistent with one embodiment of the present invention.

FIG. 2 illustrates an example of a centralized, adaptive controller-node 12 consistent with one embodiment of the present invention. The controller-node 12 illustrated in FIG. 2 includes three primary logic modules: an input/output logic 28, a control logic 30, and a storage module 32. For one embodiment of the invention, the controller-node 12 receives a script error message via the input logic 28 and routes the error message to the control logic 30, where it is analyzed. Based on the analysis, the controller-node 12 takes one of several actions, including retrieving a script command or some other data from the storage module 32 and communicating the script command, or data, to a script engine via its input/output logic 28. Alternatively, the controller-node may communicate the script command, or data, directly to the server that originally caused or reported the error.

The input/output logic 28 serves as the controller-node's primary communications interface. For one embodiment of the invention, the input/output logic 28 receives script error messages, and transmits reply messages including script commands and/or other data to other nodes on the network, including script engines. The input/output logic 28 includes two specialized logic modules, one of which is referred to in FIG. 2 as the administrative error-reporting logic 34.

The administrative error reporting logic 34 is the controller-node's 12 interface to an administrative error-reporting application. For one embodiment of the invention, any time an error is reported to the controller-node 12, and particularly when the controller-node 12 cannot determine a solution to the error, the controller-node 12 logs the error via the administrative error-reporting tool by default. For example, for one embodiment of the invention, the administrative error-reporting tool might be used to log and track errors that occur anywhere on the network. The administrative error-reporting tool may be a software application that executes on a separate node (e.g., an administrator's personal computer, or workstation), or alternatively, the tool may execute on the centralized controller-node 12. In addition to logging and tracking errors, the error-reporting tool may facilitate fixing or correcting errors. For example, for one embodiment of the invention, the controller-node's 12 error-reporting tool has an integrated script editing application that allows an administrator to quickly edit scripts to correct errors. Alternatively, the controller-node's 12 error-reporting tool may include an application debugger that allows the administrator to pinpoint the source of the error. In addition, the administrative error-reporting tool may analyze the errors for trends, thereby giving the administrator some insight into the cause of the errors.

In addition to an administrative error-reporting logic 34, the input/output logic 28 also includes alternative controller-node connection logic 36. The alternative controller-node connection logic 36 is the controller-node's 12 interface to other controller-nodes 12. For example, for one embodiment of the invention, an intranet comprises several sub-networks, each sub-network having its own controller-node 12. Each of the controller-nodes is interconnected via the network allowing the controller-nodes 12 to communicate with one another. For example, a controller-node on one sub-network, such as sub-network A illustrated in FIG. 3A, may communicate information to a controller-node on a separate sub-network, such as controller-node B on sub-network B illustrated in FIG. 3B. As will be explained in greater detail below, this allows controller-node B to learn from controller-node A.

The control logic 30 of the controller-node 12 serves two primary functions. First, the control logic 30 analyzes incoming error messages to determine the best course of action for handling errors associated with the received error messages. This first function of the control logic 30 is responsive in nature, in the sense that it occurs in response to the controller-node 12 receiving an error message. For example, the control logic 30 may simply use the received error message to query a lookup table located in the storage module 32 to determine a course of action for handling an error associated with the error number of the received error message.

The second primary function of the control logic 30 is pre-emptive in nature. For example, for one embodiment of the present invention, the control logic 30 constantly analyzes conditions and states of the network to preemptively determine solutions to possible errors that may be encountered. For example, the control logic 30 may be programmed to poll servers and or data repositories to determine certain attributes of the server or data repository. If, for example, the name of a server changes, the controller-node 12 can take notice of the change. Then, if and when a script error is caused by the name change, the controller-node 12 will have knowledge of the name change and will be able to respond to the error message by communicating the server's new name to the script engine or server that sent the error message.

Additionally, the controller-node 12 may respond to a particular error message by attempting several solutions, and then recording or tracking the solution that actually solves the error associated with the particular error message. For example, in response to a particular error message, the controller-node may respond in a manner that does not properly resolve the error. The controller node will then attempt a second solution, and possibly a third solution, until finally, a solution properly resolves the error. With each solution that the controller node attempts, the controller-node 12 records whether the attempted solution was successful for solving the particular error.

The storage module 32 is the controller-node's 12 memory, which may include one or more data repositories such as tables in a database system. It will be appreciated that the storage module 32 may be implemented in any combination of memory devices including memory modules, fixed disk drives and like devices. For one embodiment of the invention, the storage module 32 stores one or more solution tables 38. A solution table 38 maps a solution to a particular error number or type. Depending on the error, a solution may include, amongst other things, a script (e.g., a script command), data, and/or a combination of script command and data.

For one embodiment of the invention, the storage module 32 also stores state and condition information 40 for the network environment. For example, the control logic 30 may continually poll other nodes, including servers and other controller-nodes, and capture state and/or condition information related to the network. This information is stored in the storage module 32 and is used by the control logic 30 to determine potential solutions to errors associated with error messages. For example, for one embodiment of the present invention, the control logic 30 uses the state and condition information 40 stored in the storage module 32 to update, add and/or delete entries in one of the solution tables 38.

For one embodiment of the invention, the storage module 32 also stores executable scripts and commands 42, which may be executed in response to receiving a particular error message. For example, after receiving an error message, the input logic 28 analyzes the error message by looking up an error number included in the error message in one of the solution tables 38. If the solution table 38 contains an entry for the error number, the control logic 30 will retrieve the solution associated with the error number. The solution may include the name of a script stored in the storage module 32. Consequently, the control logic 30 will retrieve the script and initiate a script session by executing the script on a particular script engine.

This adaptive, self-learning capability is advantageous because it allows the controller-node 12 to preemptively determine solutions to possible script errors. For one embodiment of the invention, the self-learning algorithm of the control logic 30 is a simple memory function. For example, when the control logic 30 encounters an error message for which it cannot determine a potential solution, the control logic 30 may simply report the error to the administrative error-reporting tool via the administrative error-reporting logic. When the administrator corrects the error via the administrative error-reporting tool, the control logic 30 captures the solution and stores it in a solutions table 38 in the storage module 32. In this way, the controller-node 12 can "remember" solutions for previously encountered errors.

In another embodiment of the invention, the adaptive, self-learning capabilities of the controller-node 12 are more complex and advanced. In addition to having the memory function described above, the control logic 30 continuously analyzes states and conditions of the network environment, as well as error messages received at the input logic 28. Based on the analysis, the control logic 30 ranks, or orders, potential solutions. For example, for one embodiment of the invention, the self-learning algorithm is constantly executing in the background and it ranks or orders potential solutions by rearranging entries in the solutions table 38, based on analysis of the state and condition information 40 stored in the storage module 32. Based on the rankings, the controller node attempts different solutions in order of rank, and then reorganizes or ranks the solutions based on which solutions actually solve particular errors.

In another embodiment of the invention, in addition to having the ability to rank and/or order solutions, the algorithm implementing the self-learning capabilities is able to modify itself. For example, rather than simply re-ordering or ranking solutions, the algorithm is capable of re-ordering the criteria or attributes used to rank, or order, potential solutions. When determining what course of action is best suited for a particular error message, the algorithm may consider several attributes, including whether or not a particular action successfully resolved the same error the last time the error was encountered. Over time, the algorithm may re-order the importance or weight given to each attribute, thereby attempting to optimize the algorithm's ability to successfully resolve errors.

Figure 3A:
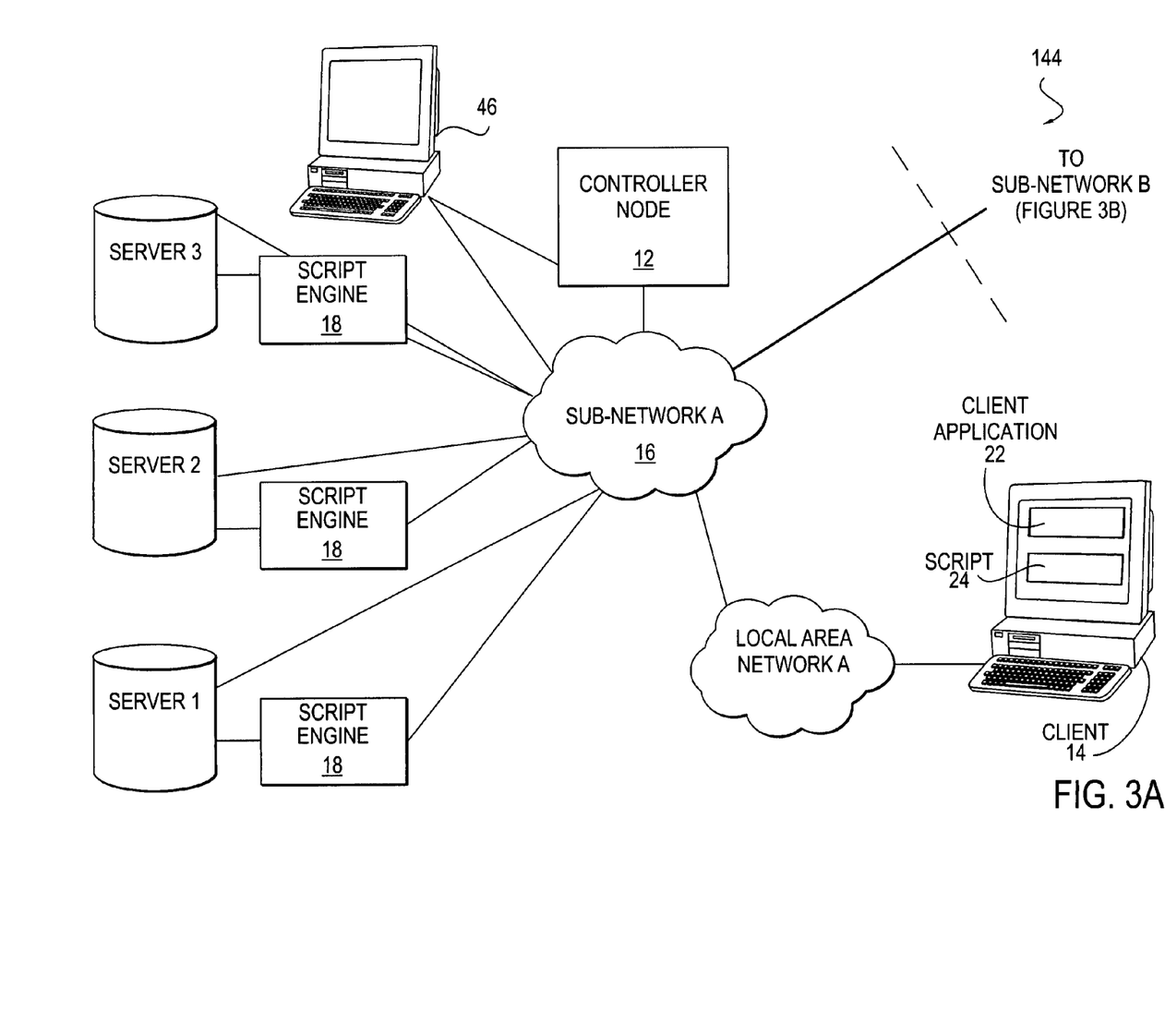
FIGS. 3A and 3B illustrate an example of a multi-network environment, each network having its own centralized, adaptive controller-node for handling exceptions.
Figure 3B:
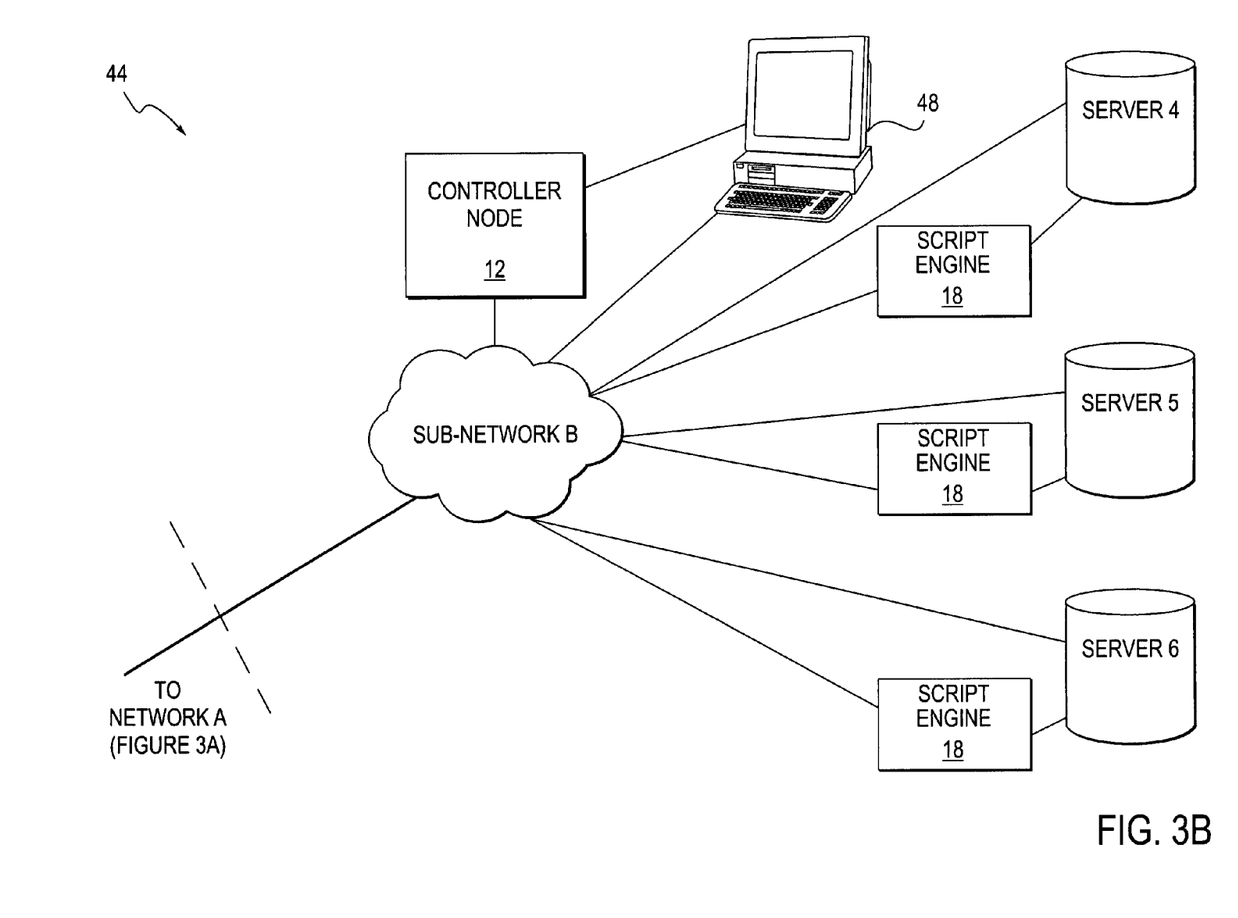

The present invention may also be implemented in a multi-network environment. FIGS. 3A and 3B illustrate an example of a multi-network environment 44, each network having its own centralized, adaptive controller-node 12 for handling exceptions. The multi-network environment 44 illustrated in FIGS. 3A and 3B includes two sub-networks, sub-network A and sub-network B. Each of the sub-networks may be independently administered within a large organization, but each sub-network is interconnected. Each sub-network includes several network-connected script engines 18 and associated servers, as well as one or more network-connected clients 14.

In a multi-network environment 44, each controller-node 12 is interconnected via its alternative controller-node connection logic 36. This allows each controller-node 12 to leverage the knowledge of other controller-nodes 12 on other sub-networks. For example, if the controller-node 12 on sub-network A receives an error message from a script-engine 18 on sub-network A, and the controller-node does not have a solution, or course of action, for the error number, then the controller-node 12 may poll the controller-node 12 on sub-network B to determine whether it has a solution to the error.

For one embodiment of the invention, the controller-nodes 12 of each sub-network operate in a peer-to-peer setting. In a peer-to-peer setting, each controller-node 12 has logic to determine when it should consult an alternative controller-node 12. For example, for one embodiment of the invention, each controller-node 12 is programmed to consult an alternative controller-node 12 only when it does not have a potential solution to an error it encounters.

In an alternative embodiment, the controller-nodes 12 operate in a hierarchical setting. In a hierarchical setting, different controller-nodes 12 are assigned varying weights or levels of importance. When a controller-node 12 encounters an error message for which it has no solution, the controller-node will only poll an alternative controller-node 12 with a greater level of importance. In this way, solutions that are input at the top-level controller-node are propagated down the chain of controller nodes 12 to lower level controller-nodes 12 over time.

Figure 4:
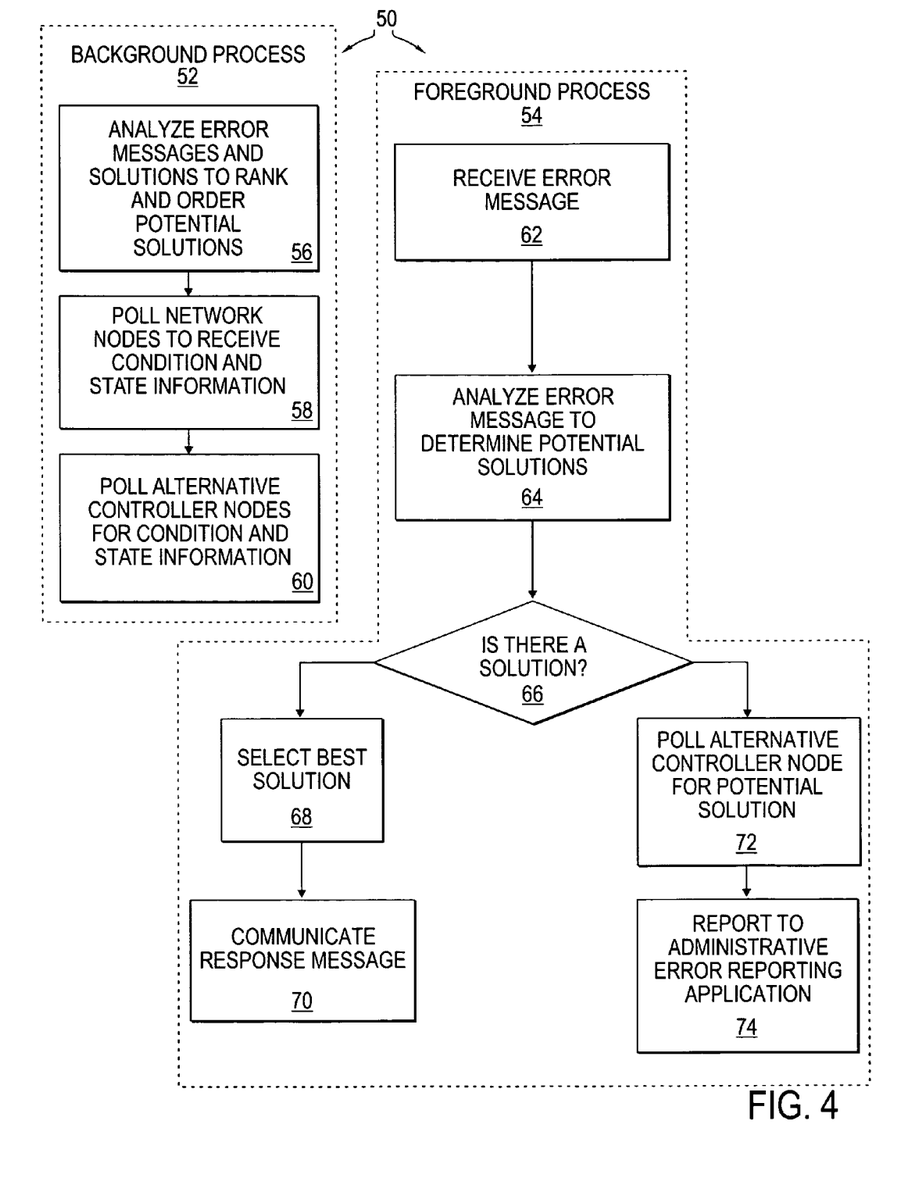
FIG. 4 illustrates a flowchart of a method for handling exceptions in a multi-node network environment with a centralized, adaptive controller-node, consistent with one embodiment of the present invention.

FIG. 4 illustrates a method 50, consistent with one embodiment of the present invention, for handling errors in a script engine environment. The method 50 illustrated in FIG. 4 includes both a background process 52 and a foreground process 54. The background process 52 is continuously executing in the background of the controller-node 12, while the foreground process 54 executes in response to an error. For one embodiment of the invention, the controller-node 12 is continuously analyzing 56 previously received error messages and potential solutions and ranking, or ordering, the potential solutions. In addition, the controller-node 12 is also polling various network nodes 58 to determine condition and state information related to the network environment. Furthermore, for one embodiment of the invention, the controller-node may be polling alternative network nodes 60 to determine conditions and state information as well as potential solutions to errors. The particular operations illustrated in FIG. 4 as occurring in the background are shown in an arbitrary order and for a particular embodiment, the operations may occur in any order, or simultaneously.

In addition to the background process, FIG. 4 also illustrates the operations performed in the foreground to handle an error message received from a script engine 18. At operation 62, the controller-node 12 receives an error message from a script engine 18. At operation 64, the controller-node 12 analyzes the error message to determine potential solutions, or actions to take, to handle the error associated with the error number received with the error message. At operation 66, the controller-node 12 determines whether any potential solutions exist. If so, at operation 68, the controller-node selects the best solution of the potential solutions identified in operation 64. At operation 70, the controller-node communicates a response message. For one embodiment of the invention, the response message includes a script command and/or data, and is communicated to the script engine 18 that originally reported the error message. However, in alternative embodiments, the response message may be communicated to an alternative node, which may then communicate a separate response to the script engine 18 that originally reported the error message.

If, at operation 66, the controller-node 12 determines that there are no potential solutions to the error, at operation 72 the controller-node 12 may poll an alternative controller-node 12, requesting information about potential solutions to the received error message. However, if no information is available at any of the alternative controller-nodes 12, for one embodiment of the invention, the controller-node 12 will simply log the error message with an administrative error-reporting application. In an alternative embodiment, the controller-node logs every error message with an administrative error-reporting application by default.

Figure 5:
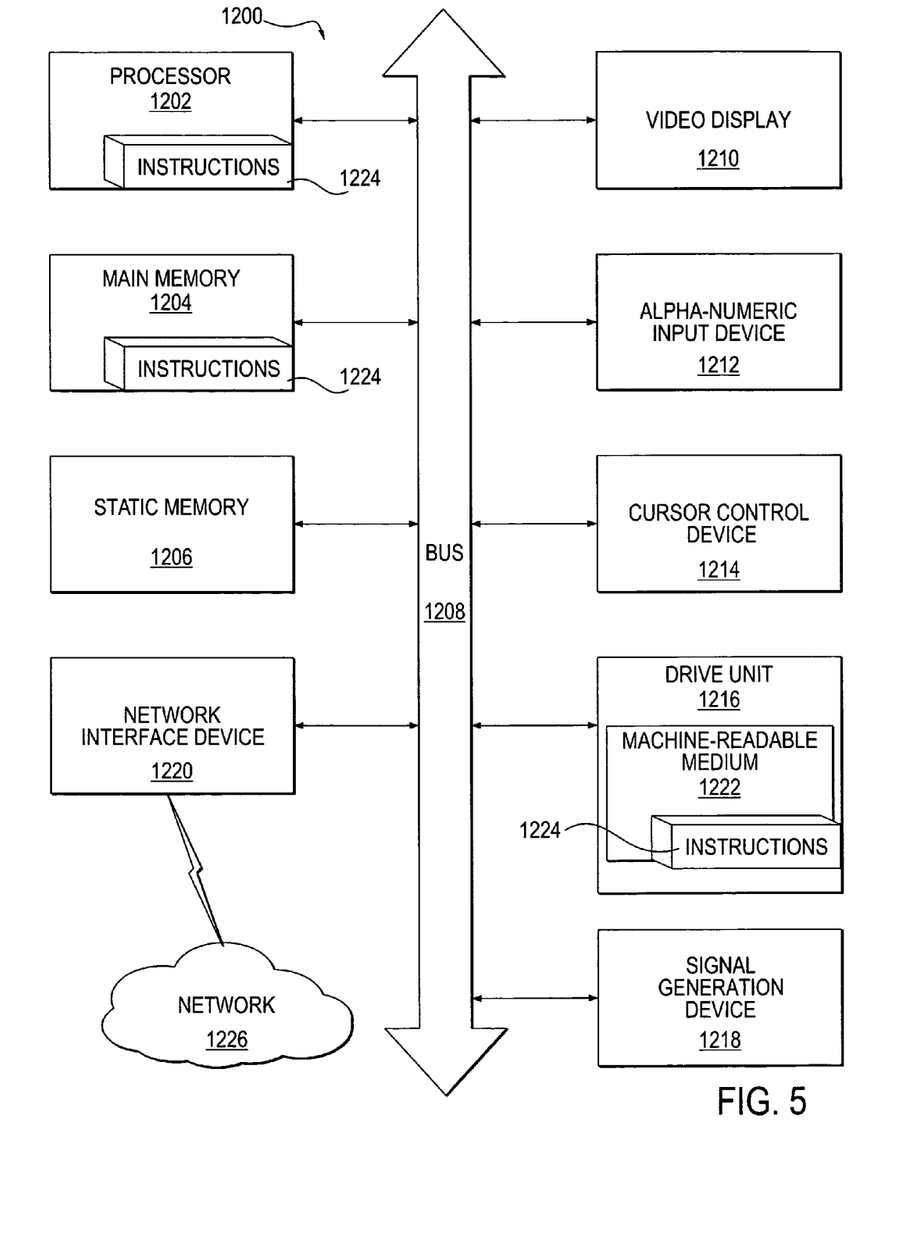
FIG. 5. illustrates a diagrammatic representation of a centralized, adaptive controller-node in the form of a computer system, within which a set of instructions, for causing the machine to perform any one or more of the methodologies discussed herein, may be executed.

FIG. 5 illustrates a diagrammatic representation of machine in the exemplary form of a computer system 1200 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 1200 includes a processor 1202 (e.g., a central processing unit (CPU) a graphics processing unit (GPU) or both), a main memory 1204 and a static memory 1206, which communicate with each other via a bus 1208. The computer system 1200 may further include a video display unit 1210 (e.g., a liquid crystal display (LCD) or a cathode ray tube (CRT)). The computer system 1200 also includes an alphanumeric input device 1212 (e.g., a keyboard), a cursor control device 1214 (e.g., a mouse), a disk drive unit 1216, a signal generation device 1218 (e.g., a speaker) and a network interface device 1220.

The disk drive unit 1216 includes a machine-readable medium 1222 on which is stored one or more sets of instructions (e.g., software 1224) embodying any one or more of the methodologies or functions described herein. The software 1224 may also reside, completely or at least partially, within the main memory 1204 and/or within the processor 1202 during execution thereof by the computer system 1200, the main memory 1204 and the processor 1202 also constituting machine-readable media. The software 1224 may further be transmitted or received over a network 1226 via the network interface device 1220.

While the machine-readable medium 1222 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals.

Thus, a method and system for handling errors in a script engine environment have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A method comprising:
    receiving at a controller-node, an error message from a network node describing an error associated with the network node;
    analyzing the error message to determine an error type for the error;
    selecting a solution from a solution table to handle the error based on the error type, wherein the solution table maps error types to solutions;
    handling the error based on the solution selected; and
    logging the error with an administrative error-reporting application, wherein the administrative error-reporting application detects possible trends in network related activity by analyzing the error message.

2. The method of claim 1, wherein handling the error based on the solution selected comprises:
    communicating a response to the network node, the response including a script command to be executed by the network node, the script command at least partially implementing the solution.

3. The method of claim 2, wherein the network node comprises a network-connected script engine, the network-connected script engine to:
    receive script commands in a generic format;
    translate the script commands from the generic format into a server-specific format; and
    send the script commands in the server-specific format to a server for execution.

4. The method of claim 2, wherein the response further comprises data.

5. The method of claim 2, wherein the script command causes the network node to continue executing a script that initially caused the error.

6. The method of claim 1, wherein handling the error based on the solution selected comprises:
    communicating a response to a script engine executing at a second network node, the response including a script command implementing the solution, the script engine executing at the second network node to execute the script command on behalf of the first network node associated with the error.

7. The method of claim 1, wherein logging the error with an administrative error-reporting application comprises:
    logging the error with the administrative error-reporting application when no alternative solution for handling the error is available from the solution table.

8. The method of claim 1, wherein analyzing the error message comprises:
    comparing the error message with previously received error messages.

9. The method of claim 1, further comprising:
    analyzing previous solutions used for previous errors;
    ranking each previous solution according to a solution selection algorithm; and
    rearranging solutions in the solutions table based on the solution selection algorithm, the solutions arranged in order of rank, wherein the rank is based on which solutions successfully solved the previous errors.

10. The method of claim 1, further comprising:
    requesting data from a second controller-node, the second controller-node located on a sub-network separate from a sub-network associated with the first controller-node, the data relating to error messages and potential solutions for those error messages.

11. In a network environment having multiple nodes, a first adaptive controller-node for handling exceptions, the first adaptive controller-node comprising:
    input logic to receive an error message from a network node, the error message including a request to handle an error associated with the network node; and
    control logic to:
        analyze the error message to determine an error type for the error, request data from a second adaptive controller-node located on a sub-network of the network environment separate from a sub-network associated with the first adaptive controller-node, wherein the data relates to error messages and potential solutions for those error messages, and select from a solution table, a solution to handle the error based on the error type and the data from the second adaptive controller-node, wherein the solution table to map error types to solutions.

12. The adaptive controller-node of claim 11, wherein the control logic to further:

send a response to the network node, the response to include a script command for execution by the network node, the script command to at least partially implement the solution; and wherein the network node comprises a network-connected script engine to execute the script command.

13. The adaptive controller-node of claim 11, wherein the control logic to further:

send a response message to a script engine executing at a second network node, the response message including a script command to at least partially implement the solution, wherein the script engine executing at the second network node to execute the script command on behalf of the first network node associated with the error.

14. A controller-node comprising:

means for receiving an error message from a network node describing an error associated with the network node;

means for analyzing the error message to determine an error type for the error; and means for selecting from a solution table a solution to handle the error based on the error type, wherein the solution table to map error types to solutions, and wherein the solution comprises means for sending a response message to a script engine separate from the network node, the response message including a script command at least partially implementing the solution, wherein the script engine to execute the script command on behalf of the network node associated with the error.

15. The controller-node of claim 14, wherein the script command comprises means to cause the network node to continue executing a script that initially caused the error.

16. The controller-node of claim 14, further comprising:

means for logging the error with an administrative error-reporting application when no alternative solution for handling the error is available from the solution table.

17. The controller-node of claim 16, wherein the administrative error-reporting application comprises means for detecting possible trends in network related activity by analyzing the error message, wherein analyzing the error message comprises means for comparing the error message with previously received error messages.

18. The controller-node of claim 14, further comprising:

means for analyzing previous solutions used for previous errors;

means for ranking each previous solution according to a solution selection algorithm; and means for rearranging solutions in the solutions table based on the solution selection algorithm, the solutions arranged in order of rank, wherein the rank is based on which solutions successfully solved the previous errors.

19. The controller-node of claim 14, further comprising:

means for requesting data from a second controller-node, the second controller-node located on a sub-network separate from a sub-network associated with the first controller-node, wherein the data relates to error messages and potential solutions for those error messages.

* * * * *